United States Patent
Baek et al.

(10) Patent No.: US 10,492,003 B2
(45) Date of Patent: Nov. 26, 2019

(54) CONTENT OUTPUT SYSTEM, DISPLAY APPARATUS AND CONTROL METHOD THEREOF

(71) Applicant: SAMSUNG ELECTRONICS CO., LTD., Suwon-si, Gyeonggi-do (KR)

(72) Inventors: Ji-seon Baek, Hwaseong-si (KR); Je-ik Kim, Yongin-si (KR); Ho-jin Eo, Suwon-si (KR); Kwan-soo Lee, Hwaseong-si (KR); Seung-pyo Hong, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/825,603

(22) Filed: Nov. 29, 2017

(65) Prior Publication Data
US 2018/0176688 A1    Jun. 21, 2018

(30) Foreign Application Priority Data
Dec. 20, 2016 (KR) .................. 10-2016-0174945

(51) Int. Cl.
*H04R 5/04* (2006.01)
*H04R 5/02* (2006.01)
(Continued)

(52) U.S. Cl.
CPC ............ *H04R 5/04* (2013.01); *H04B 5/0031* (2013.01); *H04N 21/4122* (2013.01); *H04N 21/43615* (2013.01); *H04N 21/43637* (2013.01); *H04N 21/4852* (2013.01); *H04R 5/02* (2013.01); *H04S 3/00* (2013.01); *H04S 7/302* (2013.01); *H04S 7/40* (2013.01); *H04N 2005/44517* (2013.01); *H04R 2205/024* (2013.01);
(Continued)

(58) Field of Classification Search
None
See application file for complete search history.

(56) References Cited

U.S. PATENT DOCUMENTS 8,995,240 B1    3/2015  Erven et al.
2013/0022204 A1    1/2013  Adhikari et al.
(Continued)

FOREIGN PATENT DOCUMENTS

EP    2 996 354    3/2016
JP    2011-004007    1/2011
(Continued)

OTHER PUBLICATIONS

Extended Search Report dated Feb. 23, 2018 in counterpart European Patent Application No. 17204488.5.
(Continued)

*Primary Examiner* — Paul W Huber
(74) *Attorney, Agent, or Firm* — Nixon & Vanderhye P.C.

(57) ABSTRACT

A content output system is provided. The content output system includes a display apparatus configured to display a user interface (UI) for guiding a user input for setting a speaker corresponding to each of a plurality of channels according to a predetermined event and a plurality of speaker apparatuses configured to, in response to a user input corresponding to the user input guide being received, transmit a first signal corresponding to the user input to the display apparatus.

15 Claims, 12 Drawing Sheets

(51) Int. Cl.
*H04S 7/00* (2006.01)
*H04B 5/00* (2006.01)
*H04N 21/41* (2011.01)
*H04N 21/436* (2011.01)
*H04N 21/4363* (2011.01)
*H04N 21/485* (2011.01)
*H04S 3/00* (2006.01)
*H04N 5/445* (2011.01)

(52) U.S. Cl.
CPC ...... *H04R 2420/01* (2013.01); *H04R 2420/07* (2013.01); *H04S 7/301* (2013.01); *H04S 2400/03* (2013.01)

(56) References Cited

U.S. PATENT DOCUMENTS

| | | |
|---|---|---|
| 2014/0219483 A1 | 8/2014 | Hong |
| 2014/0341399 A1* | 11/2014 | Dusse ............... H04R 5/04 381/150 |
| 2015/0256957 A1 | 1/2015 | Kim et al. |
| 2016/0007118 A1* | 1/2016 | Lee ............... H04S 7/301 381/303 |
| 2016/0073197 A1 | 3/2016 | Hammer et al. |

FOREIGN PATENT DOCUMENTS

| | | |
|---|---|---|
| KR | 10-2006-0061656 | 6/2006 |
| KR | 10-2010-0027713 | 3/2010 |
| KR | 10-2014-0099122 | 8/2014 |
| KR | 10-2016-0038699 | 4/2016 |

OTHER PUBLICATIONS

European Office Action dated Mar. 18, 2019 for EP Application No. 17204488.5.

* cited by examiner

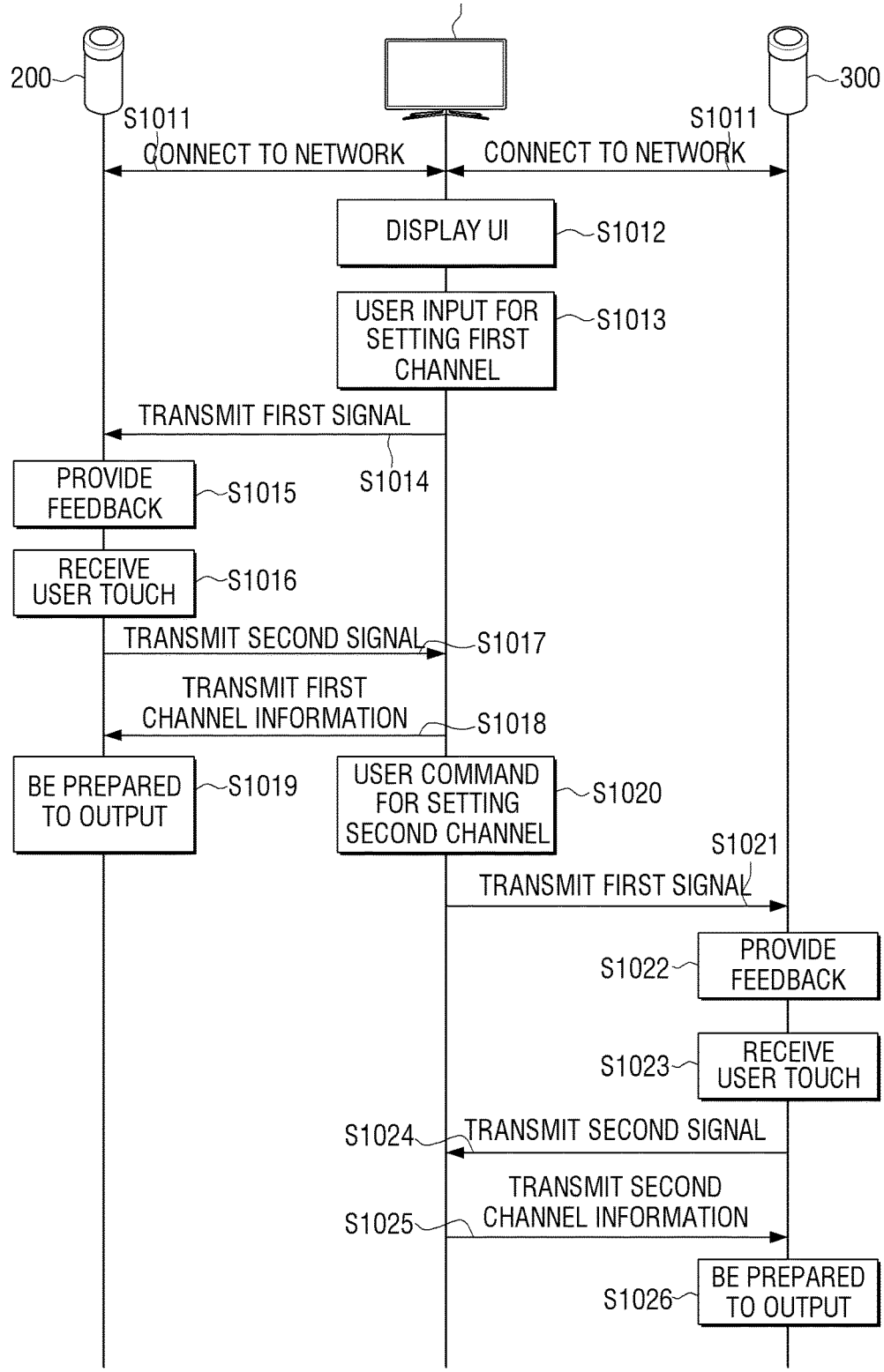

CONTENT OUTPUT SYSTEM, DISPLAY APPARATUS AND CONTROL METHOD THEREOF

CROSS-REFERENCE TO RELATED APPLICATION

This application is based on and claims priority under 35 U.S.C. Section 119 from Korean Patent Application No. 10-2016-0174945, filed in the Korean Intellectual Property Office on Dec. 20, 2016, the disclosure of which is incorporated herein by reference in its entirety.

BACKGROUND

1. Field

Apparatuses and methods consistent with example embodiments relate to a content output system, a display apparatus and a controlling method thereof, and more particularly, to a content output system outputting an acoustic content, a display apparatus and/or a control method thereof.

2. Description of Related Art

Due to the development of electronic technologies, various types of electronic devices are being developed and provided. In recent years, various types of electronic devices including TVs have been used in general households. These electronic devices gradually have various functions according to the demands of users.

For example, an audio signal reproduced from a display apparatus such as a TV is transmitted to a plurality of speaker devices connected to a wireless network to output an audio signal in a multi-channel manner, so that audio can be provided and output with better sound quality.

However, there is a problem that there is no intuitive method for the user to set a plurality of channels to correspond to a plurality of speaker devices.

SUMMARY

One or more example embodiments provide a content output system providing a user interface (UI)/user experience (UX) capable of indicating a speaker position when setting multi channels so that the user may intuitively set channels, a display apparatus and/or a control method thereof.

According to an aspect of an example embodiment, there is provided a content output system comprising a display apparatus and a plurality of speaker apparatuses, the system comprising: a display apparatus configured to display a user interface (UI) guiding a user input for setting a speaker corresponding to each of a plurality of channels according to a predetermined event; and a plurality of speaker apparatuses configured to, in response to a user input corresponding to the user input guide being received, transmit a first signal corresponding to the user input to the display apparatus. The display apparatus may, in response to the first signal being received from each of the plurality of speaker apparatuses, transmit an acoustic signal corresponding to a channel set in each of the plurality of speaker apparatuses.

The UI may guide a position of a speaker corresponding to each of the plurality of channels and guides a selection for a speaker corresponding to the plurality of channel.

The display apparatus may provide information relating to a settable multi channel type based on a number of a plurality of speaker apparatuses connected to the display apparatus according to the predetermined event, and the display apparatus may, in response to a particular multi channel type being selected, display the UI corresponding to the multi channel type.

The display apparatus may, in response to a user command for setting a speaker in the particular channel being received, transmit a second signal to the corresponding speaker apparatus, and the speaker apparatus may, in response to the second signal being received from the display apparatus, provide an indicating feedback corresponding to the second signal.

The indicating feedback may be at least one from among a visual feedback lighting a predetermined area of the speaker apparatus and an auditory feedback outputting a predetermined acoustic signal.

A predetermined area of the speaker apparatus may be a name area of the speaker apparatus.

The user input guide may be at least one from among a guide guiding a touch input for the speaker apparatus and a guide guiding a selection for the speaker apparatus through a remote controller, and the user input may be at least one from among a feedback in which a touch input from the speaker apparatus is received and a feedback in which a selection signal is received from the remote controller.

According to an aspect of an example embodiment, there is provided a display apparatus, comprising: a display; a communication interface configured to communicate with a plurality of speaker apparatuses; and a processor configured to control the display to display a UI guiding a user input for setting a speaker corresponding to each of a plurality of channels according to a predetermined event, and in response to a first signal corresponding to a user input being received from one of the plurality of speaker apparatuses, to control the communication interface to transmit an acoustic signal corresponding to the a channel set in the corresponding channel.

The UI may guide a position of a speaker corresponding to each of the plurality of channels and guides a selection for a speaker corresponding to the plurality of channel.

The processor may provide information relating to a settable multi channel type based on a number of a plurality of speaker apparatuses connected to the display apparatus according to a predetermined event, and display the UI corresponding to a selected multi channel type.

The processor may, in response to a user command for setting a speaker in a particular channel being received, transmit a second signal to at least one speaker apparatus corresponding to the particular channel, in response to the first signal being received from a speaker apparatus receiving the second signal, set the corresponding speaker apparatus in the particular channel, and transmit an acoustic signal corresponding to a channel set in the corresponding speaker apparatus.

The user input guide may be at least one from among a guide guiding a touch input for the speaker apparatus and a guide guiding a selection for the speaker apparatus.

The user input may be at least one from among a user input in which a touch is received in the speaker apparatus and a user input in which a selection signal is received from the remote controller.

According to an aspect of an example embodiment, there is provided A method for controlling a display apparatus, the method comprising: displaying a UI guiding a user input for setting a position of a speaker corresponding to each of a plurality of channels according to a predetermined event; and in response to a first signal corresponding to a user feedback being received from one from among a plurality of speaker apparatuses, transmitting an acoustic signal corresponding to a channel set in a corresponding speaker apparatus.

The UI may guide a position of a speaker corresponding to each of the plurality of channels and guides a selection for a speaker corresponding to the plurality of channel.

The displaying the UI may include displaying information relating to a settable multi channel type based on a number of a plurality of speaker apparatuses connected to the display apparatus according to the predetermined event, and displaying the UI corresponding to a selected multi channel type.

The transmitting the acoustic signal may include, in response to a user command for setting a speaker in a particular channel being received, transmitting a second signal to at least one speaker apparatus corresponding to the particular channel, and in response to the first signal being received from a speaker apparatus receiving the second signal, transmitting the acoustic signal to a corresponding speaker apparatus.

The user input guide may be at least one from among a guide guiding a touch input for the speaker apparatus and a guide guiding a selection for a speaker apparatus through a remote controller.

The user command may be at least one from among a user command in which a touch is received from the speaker apparatus and a user command in which a selection signal is received from a remote controller.

According to the various example embodiments of the present disclosure, when multi-channel setting is performed, the user can check the position of the speaker and provide user experience (UI/UX) for intuitively setting the channel, thereby improving the user's convenience.

BRIEF DESCRIPTION OF THE DRAWINGS

The above and/or other aspects, features and attendant advantages will become more apparent and readily appreciated from the following detailed description, taken in conjunction with the appended drawings. Understanding that these drawings depict only example embodiments and are not therefore to be considered as limiting of the scope of the disclosure, the principles herein are described and explained with additional specificity and detail via the use of the accompanying drawings, in which:

FIG. 10 is a sequence diagram illustrating an operation of a content output system, according to an example embodiment.

DETAILED DESCRIPTION

Figure 1:
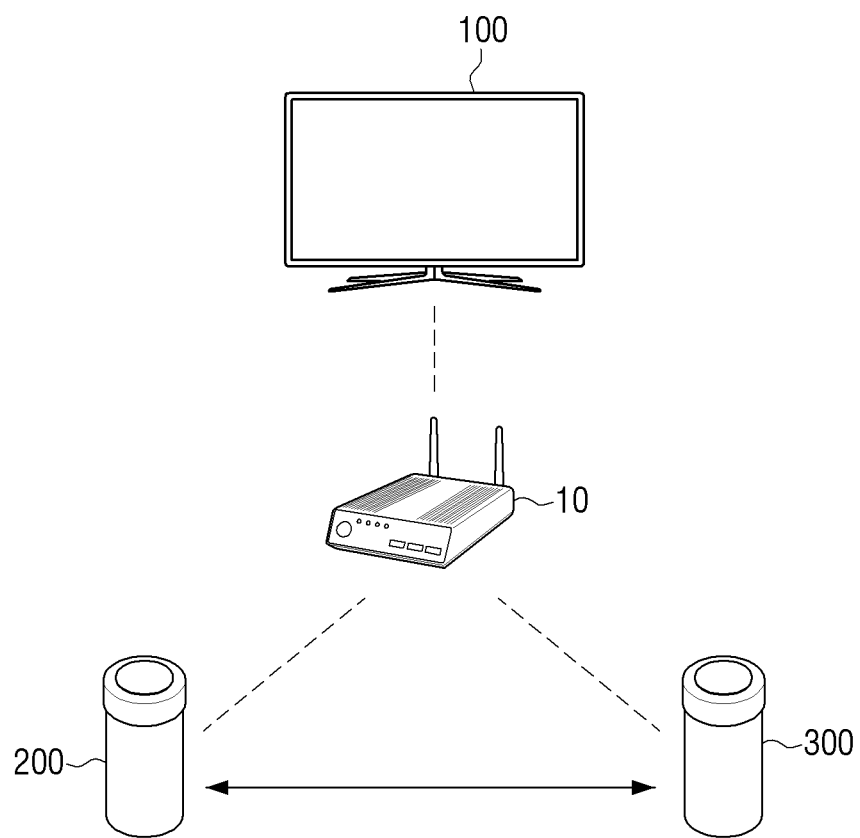
FIG. 1 is a diagram illustrating an example of implementation of a content output system, according to an example embodiment.

Hereinafter, example embodiments of the present disclosure will be explained with reference to the drawings, in which like reference numerals indicate like parts throughout the several views.

FIG. 1 is a diagram illustrating an example of implementation of a content output system, according to an example embodiment.

Referring to FIG. 1, a content output system includes a display apparatus 100 and first and second speaker apparatuses 200 and 300. The display apparatus 100 includes a display, and each speaker apparatus 200, 300 includes a speaker.

According to an example embodiment, a content output system may be implemented as a home network system which is capable of performing bi-directional communication by connecting the display apparatus 100 and the first and second speaker apparatuses 200 and 300 in one system. However, any system capable of controlling by connecting a plurality of devices via network is applicable.

In addition, the content output system may further include an additional speaker apparatus, such as third and fourth speaker apparatuses (not illustrated), each of which includes a speaker.

The display apparatus 100 is configured to communicate with the first and second speaker apparatuses 200 and 300. For example, the display apparatus 100 may perform Wi-Fi communication with the first and second speaker apparatuses 200 and 300 based on access point (AP), but it is also possible to use other communication methods. In casein example embodiment, the display apparatus 100 may be implemented as a smart TV, but the invention is not limited thereto, and the display apparatus 100 may be implemented as any of various types of electronic apparatuses including a display function (e.g., LCD, LED, and/or OLED), such as a smartphone, a tablet PC, a desktop PC, a large format display (LFD), a digital signage, a digital information display (DID), a video wall, a projector display, and/or the like.

The first and second speaker apparatuses 200 and 300 may each be implemented as any speaker apparatus capable of outputting an acoustic content, such as a wireless speaker, a sound bar, a room speaker, and/or the like. Here, the first and second speaker apparatuses 200 and 300 may communicate with each other. For example, the first and second speaker apparatuses 200 and 300 may perform a Peer-to-Peer (P2P) communication, in particular, a Wi-Fi P2P (or Wi-Fi Direct) communication via a Wi-Fi network. In this case, the Wi-Fi Peer-to-Peer (P2P) refers to a method in which devices in which Wi-Fi is mounted directly communicate with each other without going through an AP 10 supporting connection between Wi-Fi alliance devices. However, the examples herein are not limited thereto, and the first and second speaker apparatuses 200 and 300 may perform a Wi-Fi communication based on the AP 10 or perform communication by using another communication method, such as Bluetooth or the like.

According to an example embodiment, one of the first and second speaker apparatuses 200 and 300 may be operated as a master device according to a P2P connection method, and the other one may be operated as a slave device. In this case, it may be implemented such that the master device, for example, the first speaker apparatus 200, may receive an acoustic content from the display apparatus 100 and output the received acoustic content, transmit the content received from the display apparatus 100 to the slave device, for example, the second speaker apparatus 300, and that the second speaker apparatus outputs the content received from the first speaker apparatus 200.

According to another example embodiment, it is also possible that the first and second speaker apparatuses 200 and 300 may respectively receive an acoustic content from the display apparatus 100 and output the received acoustic content.

The display apparatus 100 may include a speaker therein and a speaker may be attached to the display apparatus. For example, a speaker of or associated with the display apparatus may be implemented in the form of a sound bar.

In an example embodiment, a built-in/attached type sound bar may provide a multi channel acoustic mode along with the first and second speaker apparatuses 200 and 300. However, under some circumstances, it is also possible that a sound bar which is spaced apart at a near distance from the display apparatus 100 and communicates with the display apparatus 100 provides a multi channel acoustic mode along with the first and second speaker apparatuses 200 and 300.

The multi channel acoustic mode may be carried out according to an application or program pre-stored in the display apparatus 100. In this case, the first and second speaker apparatuses 200 and 300 may be set as a multi channel speaker in a UI screen provided in the corresponding menu. However, it is also possible that the multi channel acoustic mode is performed by a processor included in the display apparatus 100. For example, when it is desired to set a surround channel, a built-in speaker bar in the display apparatus 100 may be operated as a center channel, a front L channel and a front R channel, and the first and second speaker apparatuses 200 and 300 may be operated as a surround L channel and a surround R channel, respectively.

Meanwhile, according to an example embodiment of the present disclosure, the display apparatus 100 may provide an intuitive UI/UX for a multi channel acoustic setting. The various example embodiments of the present disclosure will be described below, with reference to the accompanying drawings.

Figure 2A:
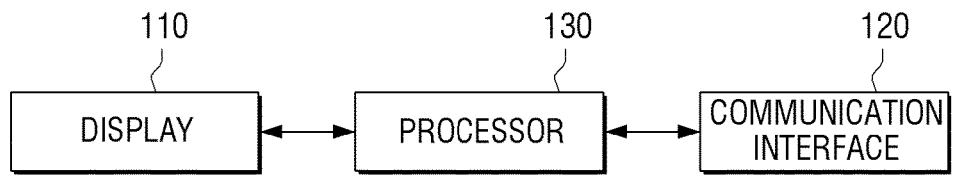
FIG. 2A is a block diagram illustrating a display apparatus, according to an example embodiment.

FIG. 2A is a block diagram illustrating a configuration of a display apparatus 100 according to an example embodiment of the present disclosure.

Referring to FIG. 2A, the display apparatus 100 includes a display 110, a communication interface (including communication circuitry) 120, and a processor 130.

The display 110 may provide various content screens. In this case, the content screen may include various contents such as an image, a video, a text, a music, and/or the like, an application execution screen including various contents, a graphic user interface (GUI), etc.

The display 110 may be implemented with various types of displays such as a liquid crystal display (LCD), an organic light emitting diode (OLED) display, a liquid crystal on silicon (LCoS) display, and a digital light processing (DLP) display, but the examples herein are not limited thereto. In addition, the display 110 may be implemented in the form of a touch screen constituting a mutual layer structure with a touch pad according to circumstances where the display 110 may be used as a user interface in addition to an output apparatus.

In particular, the display 110 may provide various UI screens associated with multi channel acoustic setting (or multi channel setting). For example, the display 110 may provide a UI screen for setting a sound channel(s) in a plurality of external speaker apparatuses, etc. Hereinafter, it will be assumed that a plurality of external speaker apparatuses are implemented as the first and second speaker apparatuses 200 and 300 of FIG. 1.

The communication interface 120 communicates with at least one of the first and second speaker apparatuses 200 and 300 of FIG. 1. For example, the communication interface 120 may perform communication via an AP-based WI-Fi (Wireless LAN network) communication. In this case, the communication interface 120 may be implemented in the form of a Wi-Fi communication module. However, the example is not limited thereto, but can be applied as long as it is suitable for the example embodiment of the present disclosure. For example, it is also possible that the communication interface 120 uses a communication network, such as Bluetooth, ZigBee, wired/wireless local area network (LAN), WAN, Ethernet, and the like.

The processor 130 may include various processing circuitry and controls overall operations of the display apparatus 100. The processor 130 may include one or more from among various processing circuitry, such as, for example, and without limitation, one or more of a dedicated processor, a central processing unit (CPU), a controller, application processor (AP), communication processor (CP), or an ARM processor. In addition, the processor 120 may be implemented as a digital signal processor (DSP) and a SoC in which a content processing algorithm may be mounted, and may be implemented in the form of a field programmable gate array (FPGA).

The processor 130 may provide a user interface (UI) including information relating to a settable multi channel type based on at least one from among the number of speaker apparatuses connected (or connectable) with the display apparatus 100 and a type of the speaker apparatus according to a predetermined event. In this regard, the UI may include a disposition position of a speaker corresponding to each multi channel type. In addition, the connectable speaker apparatus may be a speaker apparatus which is not currently connected but may be connected according to a predetermined event (e.g., turning on of a device) (e.g., a device registered by Bluetooth pairing, in a state in which a Wi-Fi pairing is complete), etc. The predetermined event may be an event in which a surround setting is selected from a sound setting menu of the display apparatus 100, but the example is not limited thereto. In another example, the predetermined event may include various events, such as a case in which a new speaker enters a predetermined distance range of the display apparatus 100, a case in which a connection of a speaker previously connected is released, in a case in which a position of a previously-connected speaker is outside of a predetermined distance range, a case in which an external source device enters a predetermined distance range, and/or the like.

For example, it will be assumed that the number of external speaker apparatuses connected to the display apparatus 100 is two, that the display apparatus 100 is provided with a speaker bar providing a center channel, a front L channel and a front R channel, and that the speaker bar is provided with a low-frequency speaker (woofer). In this regard, up to 5 channels may be reproduced and thus, a UI including information relating to 2.1 channel, 3.1 channel and 5.1 channel may be provided.

In this regard, the processor 130 may provide a UI including information relating to a settable multi channel type in consideration of not only the number but also type of external speaker apparatuses connected to the display apparatus 100. For example, in 5.1 channel, reproduction can be carried out with five speakers and one woofer speaker (low-frequency speaker), and thus as described above, in a case in which the display apparatus 100 is provided with a low-frequency speaker (woofer) or a woofer is connected with the display apparatus 100, 5.1 channel may be provided as a settable type.

The processor 130 may, when a particular multi channel type is selected according to a user command, control the display 110 to provide a UI for the corresponding multi channel acoustic setting (or surround setting) (or a UI for setting a speaker corresponding to a plurality of channels). In this regard, the UI may include a guide with respect to a speaker position corresponding to each of a plurality of channels and a user input area for setting a speaker for a particular channel.

For example, the UI may guide a speaker position corresponding to a surround L channel and a surround R channel with reference to the display apparatus 100 and a user input for setting a particular speaker for the corresponding channel. In this regard, the user input guide may include at least one from among a guide inducing a user to touch a particular speaker apparatus and/or a guide inducing a user to select a particular speaker apparatus through a remote control apparatus. For example, the guide inducing a user to touch a particular speaker apparatus may be a guide inducing a user to touch a predetermined area of the speaker apparatus, for example, an upper end area of the speaker apparatus. In addition, the guide inducing a user to select a particular speaker apparatus through a remote control apparatus may be a guide inducing a user to perform a pressing operation with respect to a particular button (e.g., ok button) in a state in which the remote control apparatus is facing the particular speaker apparatus.

In addition, a UI may include an item allowing a speaker selection so that a user may set a speaker for a particular channel. For example, the surround L channel item may be in the form that a list of settable speakers are provided simultaneously or individually in order to the corresponding channel.

According to an example embodiment, the processor 130 may, in response to a speaker apparatus corresponding to a particular channel being selected, transmit a control signal to the corresponding speaker via communication interface 120.

For example, in response to a first speaker apparatus 200 being selected from the surround L channel item by a selection GUI (e.g., cursor, highlight, touch, etc.), a control signal may be transmitted to the first speaker apparatus 200. In this regard, the first speaker apparatus 200 may provide an indicating feedback corresponding to the corresponding control signal. In this regard, the indicating feedback may be in the form of at least one from among a visual feedback and an auditory feedback. In this regard, the user may identify a position of the first speaker apparatus 200 selected from the surround L channel item based on the corresponding indicating feedback.

According to another example embodiment, in response to a particular channel being selected, the processor 130 may transmit a control signal to at least one settable speaker to the selected channel even if no speaker is selected.

For example, in response to the surround L channel item being selected by a selection GUI (e.g., a cursor, highlight, touch, etc.), a control signal may be transmitted to the first speaker apparatus 200 and the second speaker apparatus 300, which are settable, to the surround L channel. In this regard, the first speaker apparatus 200 and the second speaker apparatus 300 may provide an indicating feedback corresponding to the corresponding control signal. In this regard, for example, the user may identify a position of the first speaker apparatus 200 settable for a surround L channel based on the indicating feedback.

According to another example embodiment, in response to a particular channel being selected, the processor 130 may transmit a control signal to at least one settable speaker to the particular channel based on positions of a plurality of speaker.

For example, in response to a surround L channel item being selected by a selection GUI (e.g., a cursor, highlight, touch, etc.), a control signal may be transmitted to the first speaker apparatus 200, which is settable, to the surround L channel based on positions of the first speaker apparatus 200 and the second speaker apparatus 300. In this regard, the first speaker apparatus 200 may provide an indicating feedback corresponding to the corresponding control signal. In this regard, the user may identify a position of the first speaker apparatus 200 based on the indicating feedback.

Specifically, in response to a predetermined signal corresponding to a user input guide being received from one of a plurality of speaker apparatuses, the processor 130 may set the corresponding speaker apparatus as a speaker outputting the selected channel.

For example, in a case in which a guide inducing a user to touch a speaker apparatus desired to be set is provided, in response to a signal corresponding to a user touch being received for the first speaker apparatus 200, the processor 130 may set the first speaker apparatus 200 as a surround L channel. In addition, in a case in which a guide inducing a user to select a speaker apparatus through a remote controller is provided, in response to a signal corresponding to a remote controller selection being received for the first speaker apparatus 200, the processor 130 may set the first speaker apparatus 200 as a surround L channel. In addition, in a case in which a guide inducing a user to perform a pressing operation with respect to a predetermined button provided in a speaker apparatus to be set is provided, in response to a signal corresponding to a pressing operation of the corresponding button being received from the first speaker apparatus 200, the processor 130 may set the first speaker apparatus 200 as a surround L channel.

In addition, in response to a predetermined signal corresponding to a user input guide being received from one of a plurality of speaker apparatuses, the processor 130 may set the corresponding speaker apparatus as the selected channel.

For example, in response to a signal corresponding to a user touch being received from the first speaker apparatus 200, the processor 130 may transmit information relating to a surround L channel to the first speaker apparatus 200. In this regard, the speaker apparatus 200 may be prepared to output the corresponding channel based on the information relating to the surround L channel.

In example embodiment(s) described above, the user inputs a user command through a speaker apparatus, such as directly touching the speaker apparatus 200 or making a selection through a remote controller, or the like, but according to circumstances, a user command may be input through the display apparatus 100. For example, in a state in which the first speaker apparatus 200 provides an indicating feedback, in response to a user performing a pressing operation with respect to ok button of a remote controller toward the display apparatus 100, it may have the same effect as the case where a signal corresponding to a user command is received from the first speaker apparatus 200. That is, in response to a remote control signal being received, the display apparatus 100 may set the first speaker apparatus 200 to the corresponding channel and transmit the corresponding channel information to the first speaker apparatus. However, in this case, a guide may be provided as a guide inducing a user to perform a pressing operation with respect to ok button of a remote controller toward the display apparatus 100.

Figure 2B:
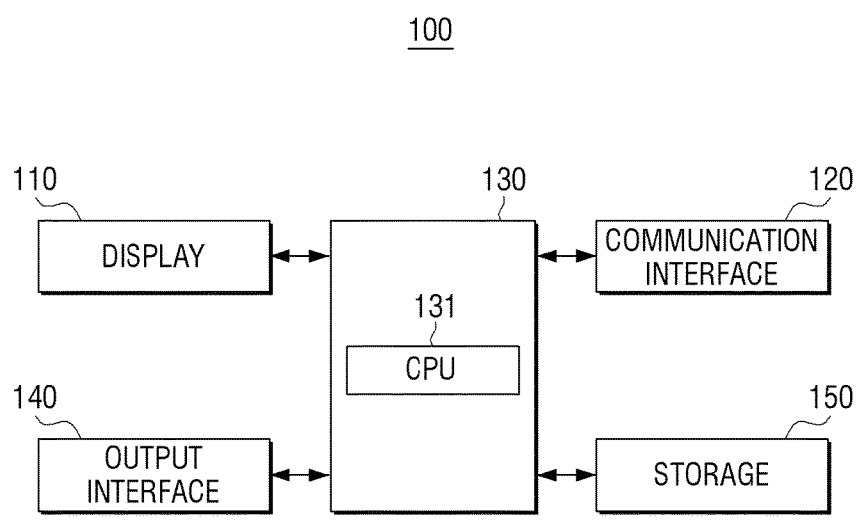
FIG. 2B is a block diagram illustrating details of the display apparatus in FIG. 2A.

FIG. 2B is a block diagram illustrating details of the display apparatus 100 in FIG. 2A.

Referring to FIG. 2B, a first content output display apparatus 100 includes a display 110, a communication interface (including circuitry) 120, a processor 130, an output interface (including circuitry) 140 and a storage/memory 150. Descriptions of the same elements discussed above for FIG. 2A, may be omitted with respect to FIG. 2B.

The processor 130 may include, for example, and without limitation, a CPU 131, a ROM (or a non-volatile memory) in which a control program for controlling the display apparatus 100 is stored and a RAM (or volatile memory) used to store data input from outside of the display device 100 or used as a storage area corresponding to various operations performed in the display apparatus 100.

In response to a predetermined event occurring, the processor 130 may execute an Operating System (O/S), programs and various applications which are stored in the storage 150. The processor 130 may include a single core, dual core, triple core, quad core, and multiples of cores.

The CPU 131 accesses the storage 150 and performs booting using the O/S stored in the storage 150. In addition, the CPU 131 may perform various operations using various programs, content, data, etc. which are stored in the storage 150.

In addition, the processor 130 may include a digital signal processor (DSP), and the DSP may add various functions, such as a digital filter, effect, sound field effect, and the like, and the oversampling technique to prevent sound deterioration during conversion between digital and analog may be applied via a sample rate converter (SRC).

The output interface 140 functions to output an audio signal. For example, the output interface 140 may include a plurality of speaker units (or audio amplifier) capable of outputting multi channels. For example, the output interface 140 may include an L channel speaker and an R channel speaker which reproduce an L channel and an R channel, respectively. However, this example is not limited thereto, and the output interface 140 may be implemented in various forms. In another example, the output apparatus 140 may be implemented in the form of a sound bar that reproduces an L channel, an R channel and a Center channel.

The storage 150 may store various data, programs or applications which are used to drive and control the display apparatus 100. The storage 150 may store a control program for controlling the display apparatus 100 and the processor 130, an application firstly provided from a manufacturing company or downloaded from an external source, databases or data related thereto. For example, the storage 150 may provide a UI for multi channel setting according to the various example embodiments, and store programs for carrying out operations associated with the UI.

In an example case, the storage 150 may be realized as an internal memory such as ROM, RAM included in the processor 130, or may be realized as a memory separate from the processor 130. The storage 150 may be realized in the form of a memory embedded in the display apparatus 100, or may be realized in the form of a memory that may be detached from the display apparatus 100 according to the usage of data storage. For example, data for driving the display apparatus 100 may be stored in a memory embedded in the display apparatus, and data for an extension function of the display apparatus 100 may be stored in a memory that may be detached from the display apparatus 100. The memory embedded in the display apparatus 100 may be realized in the form of a non-volatile memory, volatile memory, hard disk drive (HDD), solid state drive (SDD), or the like, and the memory that may be detached from the content output apparatus 200 may be realized in the form of a memory card (e.g., micro SD card, USB memory), an external memory that is connectable to a USB port (e.g. USB memory), and the like.

Figure 3:
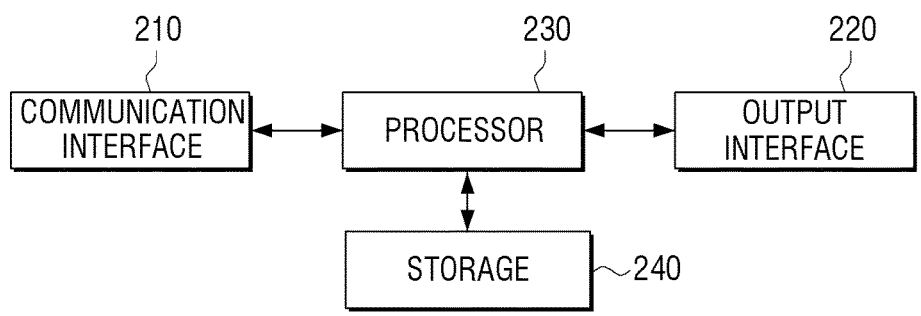
FIG. 3 is a block diagram illustrating a configuration of a speaker apparatus, according to an example embodiment.

FIG. 3 is a block diagram illustrating a configuration of a speaker apparatus 200 (or 300), according to an example embodiment.

Referring to FIG. 3, a speaker apparatus 200 includes a communication interface 210 (including communication circuitry), an output interface 220 (including interface circuitry) and a processor 230 (including processing circuitry).

The communication interface 210 communicates with an external device (e.g., display apparatus 100 and/or an external speaker apparatus 300).

The communication interface 210 may communicate with the display apparatus 100 via a first communication network. In this regard, the first communication network may be an AP-based Wireless LAN network, and in this example case, the communication interface 210 may be implemented as a Wi-Fi communication module. However, the communication interface 210 may communicate with the display apparatus 100 via any communication network operating similarly to the Wireless LAN network.

In addition, the communication network 210 communicates with the external speaker apparatus 300 via a second communication network. In this regard, the second communication network may be a peer to peer (P2P) network. For example, the second communication network may be, in particular, a Wi-Fi Peer-to-Peer (P2P) (or Wi-Fi Direct) network, and in this case, the communication interface 210 may be implemented as a Wi-Fi communication module. However, the example is not limited thereto, and the first communication network and the second communication network may use the same communication network (for example, Wireless LAN network).

The output interface 220 outputs a content received from the display apparatus or user terminal 100. The output interface 220 may be implemented as a display, an audio amplifier, and the like.

The processor 230 may include various processing circuitry and controls overall operations of the speaker apparatus 200. The implementation type of the processor 230 is the same as that provided for the processor 130 in the display apparatus 100, and thus a detailed description thereof is omitted.

In response to a control signal according to a user command being received from the display apparatus 100, the processor 230 may provide a first indicating feedback corresponding to the corresponding control signal. In this regard, the user command may be a command for setting a speaker to a particular channel in the display apparatus 100. In addition, the first indicating feedback may be at least one from among a visual feedback and an auditory feedback. In this regard, the visual feedback may be a feedback that lights a predetermined area of the speaker apparatus 200. The auditory feedback may be a feedback that outputs a predetermined acoustic signal.

In addition, in response to a user command being received after the first indicating feedback is provided, the processor 230 may transmit a signal corresponding to the user command to the display apparatus 100. For example, in response to a user touch feedback being received at the speaker apparatus 200, the processor 230 may transmit a signal indicating that the user touch feedback is received to the display apparatus 100.

In addition, in response to channel information set to the speaker apparatus 200 being received from the display apparatus 100, the processor 230 may be prepared to perform an output corresponding to the set channel. For example, the processor 230 may be prepared to output by, for example, adjusting volume to correspond to the set channel, etc.

In addition, the processor 230 may provide a second indicating feedback indicating that channel setting is completed. In this regard, the second indicating feedback may be at least one from among a visual feedback lighting a predetermined area of the speaker apparatus 200 and an auditory feedback outputting a predetermined acoustic signal. In this regard, the visual feedback and the auditory feedback may be provided in a different form from the first indicating feedback. For example, the second indicating feedback may be provided in a lighting color different from the first indicating feedback, or may be provided as a different acoustic signal (e.g., "it is set to the left channel").

Meanwhile, a light emitting element (e.g., LED) may be provided in a predetermined area of the speaker apparatus 200 so that the predetermined area can be lighted according to control of the processor 230.

The processor 230 may provide a visual feedback of a different display pattern or color according to characteristics (or types) of an indicating feedback. In this regard, the predetermined area may, for example, be a name area, such as an upper end or a side, of the speaker apparatus 200, but is not limited thereto.

As another example, the predetermined area may be an upper outer area, and in this case, a plurality of light emitting elements may be arranged at predetermined intervals in the upper outer area. For example, in an example case in which the speaker apparatus 200 has a cylindrical shape, an upper end of the speaker apparatus 200 may have a circular shape, and a plurality of light emitting elements may be arranged at predetermined intervals along an edge of the circular shape. According to circumstances, a transparent sheet may be disposed on a plurality of LEDs so that lights of the plurality of LEDs may be continuously expressed without any boundary. The plurality of LEDs may be implemented to have the same color or different colors. In addition, the plurality of LEDs may have different colors according to a disposition position. According to circumstances, a pair of LEDs of different colors may be disposed to be adjacent to each other. At least two LEDs may be adjacently disposed at the same position so that a display patterns of two or more colors may be provided. For example, in a case in which a plurality of LED pairs disposed at the same position include LEDs of red color and LEDs of blue color, only LEDs of red color or LEDs of blue color may be used according to a UI screen or alternatively, a display pattern of pink color may be provided by simultaneously using LEDs of red color and LEDs of blue color.

Meanwhile, in response to a content and a content output request being received from the display apparatus 100, the processor 230 outputs the received content via the output interface 220. Depending on cases, the processor 230 may transmit the received content to the external speaker apparatus 300.

The storage 240 may store a content received via the communication interface 210, or may store a captured content to transmit the captured content to the external speaker apparatus 300. The storage 240 may further store an Operating System (OS), programs and various programs necessary for operating the speaker apparatus 200. In this case, the storage 240 may be realized as an internal memory included in the processor 230, or may be realized as a memory separate from the processor 230. Further, the storage 240 may be implemented as being similar to the storage 150 of the display apparatus 100 illustrated in FIG. 2B.

Figure 4:
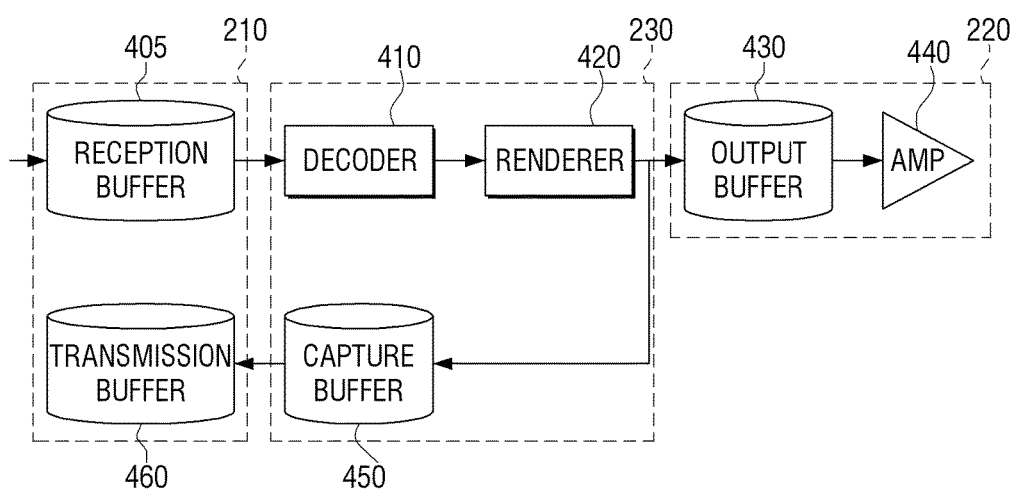
FIG. 4 is a diagram illustrating a content processing method of a speaker apparatus, according to an example embodiment.

FIG. 4 is a diagram illustrating a content processing method of a speaker apparatus 200 (or 300), according to an example embodiment.

Referring to FIG. 4, a content received from the display apparatus 100 is stored in a reception buffer 405.

According to an example embodiment, a reception buffer 405 and a transmission buffer 460 may be implemented as a component of the communication interface 210 (FIG. 3), and a decoder 410, a renderer 420 and a capture buffer 450 may be implemented as components of the processor 230 (FIG. 3) in certain example embodiments. In addition, an output buffer 430 and an AMP 440 may be implemented as components of the output interface 220 in certain example embodiments. However, this is only an example, and an example embodiment may be implemented in a different form. For example, the reception buffer 405, the capture buffer 450 and the transmission buffer 460 may be implemented as a component of the storage 240 (not illustrated) in certain example embodiments.

A content stored in the reception buffer 405 is provided to the decoder 410 and decoded, and the decoded content is provided to the renderer 420 and rendered. In this case, the decoder 410 and the renderer 420 may be implemented in the form of a type of DSP.

Thereafter, a content which is rendered by the renderer 420 may be buffered in the output buffer (or reproduction buffer) 430 and output via the AMP 440. In this regard, the processor 230 of speaker apparatus 200 may delay a time point at which the output buffer 430 provides a content to the AMP 440 for synchronization with the external speaker apparatus 300.

Meanwhile, a content which is rendered by the renderer 420 is buffered by the output buffer 430 while being copied and buffered in the capture buffer 450. A content which is buffered in the capture buffer 450 may be provided to the transmission buffer 460 and streamed to the external speaker apparatus 300. For example, the transmission buffer 460 may be implemented as a buffer of a Wi-Fi Driver terminal.

However, in a case in which a content received from the display apparatus 100 is a stream content encoded with surround sound, only the first channel (e.g., L channel) content from among contents rendered by the renderer 420 may be provided to the output buffer 430 and only the second channel (e.g., R channel) content may be buffered in the capture buffer 450 so that the contents are provided to the transmission buffer 460. However, in a case in which the speaker apparatus 200 does not transmit a received content to an external speaker apparatus (e.g., 300), operations associated with the capture buffer 450 and the transmission buffer 460 may be omitted.

Figure 5:
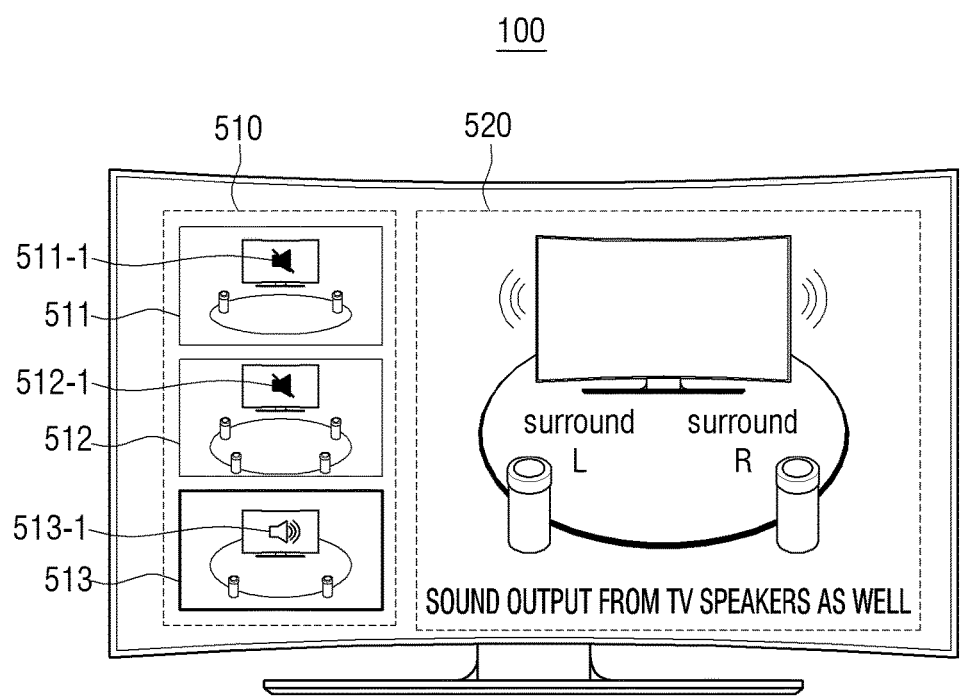
FIGS. 5, 6A and 6B are diagrams illustrating an example of a user interface (UI) provided in a display apparatus, according to an example embodiment of the present disclosure.
Figure 6A:
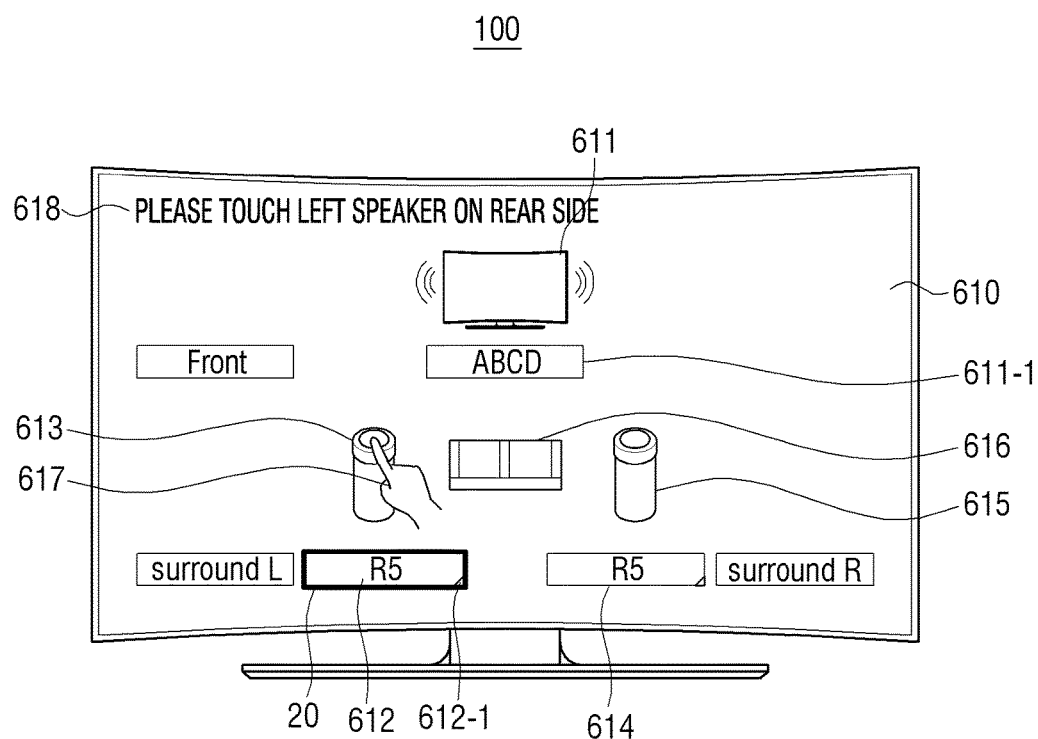
Figure 6B:
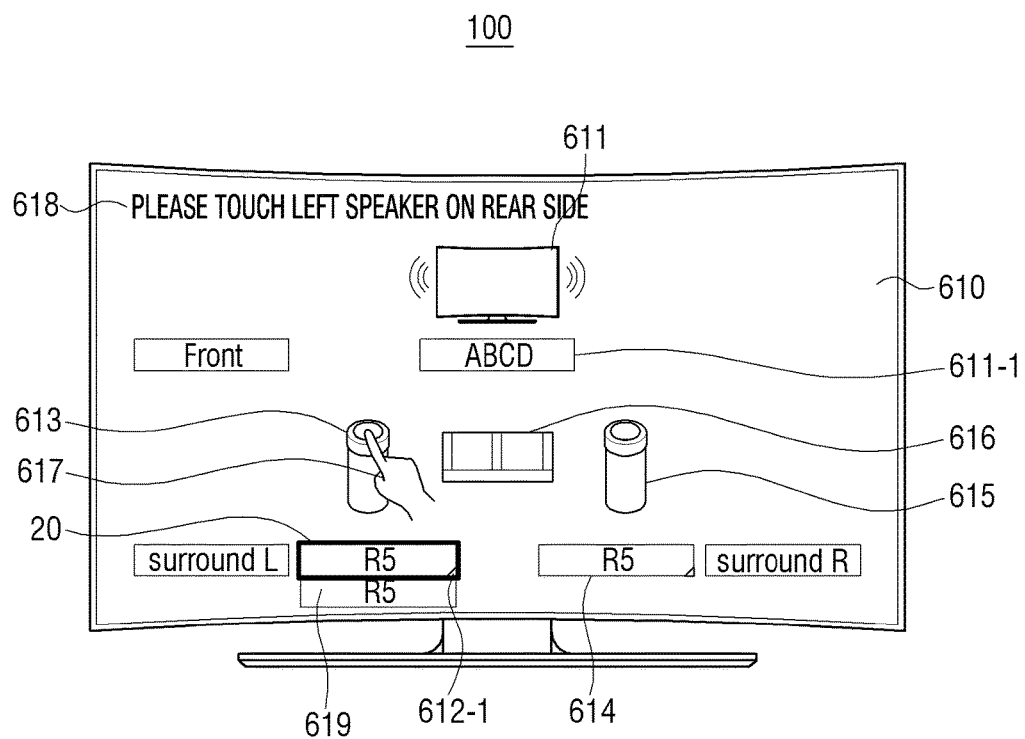

FIGS. 5, 6A and 6B are diagrams illustrating an example of a user interface (UI) provided in a display apparatus 100, according to an example embodiment.

FIG. 5 illustrates an example of a user interface (UI) which is provided according to a predetermined event. In this regard, the predetermined event may be an event in which a surround setting is selected from a sound setting menu of the display apparatus 100, but the example is not limited thereto.

As illustrated in FIG. 5, information 510 relating to settable multi channel types may be provided in one area of the screen of display apparatus 100, and detailed information 520 relating to a multi channel type 513 at which a cursor is positioned may be provided in another area of the screen. The information relating to multi channel types may be a schematic representation of the number and positions of speakers are schematized based on the display apparatus 100 as shown.

For example, a first multi channel type 511 and a second multi channel type 512 are types 511-1 and 512-1 in which sound is not output from the TV speakers and a third multi channel type 513 may be a type 513-1 in which sound is output from the TV speakers as well.

Thereafter, in response to the third multi channel type 513 at which a cursor 20 is positioned being selected, a UI 610 for speaker setting may be displayed as illustrated in FIG. 6.

The UI 610 for speaker setting includes an icon 611 corresponding to the display apparatus 100, a plurality of speaker icons 613 and 615 corresponding to the plurality of speaker apparatuses 200 and 300, and a plurality of channel setting items 612 and 614. In this regard, a name 611-1 of the display apparatus 100 may be displayed in an area of the display apparatus icon 611, but example embodiments are not limited thereto.

In addition, the display apparatus icon 611 and the plurality of speaker icons 613 and 615 may be displayed such that relative disposition position of the display apparatus 100 and the plurality of speakers 200 and 300 is represented. In this regard, an object image 616 (e.g., an image of a couch) on which the relative position is based may be displayed as well.

In addition, a UI 617 and 618 guiding a user input for setting speakers to a particular channel may be provided on the UI 610. In this regard, the guide may include at least one from among an image guide 617 and a text guide 618 which guides the user to touch a particular speaker, as shown for instance in FIG. 6.

Meanwhile, the plurality of channel setting items 612 and 614 may be displayed along with names of the channels, and in response to the corresponding items 612 and 614 being selected, it is possible to change speakers. For example, in a case in which a GUI 612 indicating that an additional speaker capable of setting surround L channel is present is displayed, in response to the first channel setting item 612 being selected, a list 619 of names of the speakers capable of setting surround L channel may be displayed as illustrated in FIG. 6B.

According to an example embodiment, in response to the first speaker apparatus 200 being selected from the first channel setting item 612 for surround L channel setting, the display apparatus 100 may transmit the corresponding signal to the first speaker apparatus 200. The first speaker apparatus 200 receiving the signal may be provide an indicating feedback to induce selection. In this regard, the indicating feedback may be in the form of at least one from among a visual feedback and an auditory feedback. In this regard, the user may identify a position of the first speaker apparatus 200 based on at least one from among the visual feedback and the auditory feedback. In response to the first speaker apparatus 200 being desired to be set to a first channel, the user may input a user command (e.g., touch input) to the first speaker apparatus 200 according to a guide (e.g., 617 and/or 618) provided on the display apparatus 200.

In another example embodiment, in response to the first channel setting item 612 being selected, the display apparatus 100 may transmit the corresponding signal to all speaker apparatuses settable to the corresponding channel regardless of whether the speaker apparatus 200 is selected or not.

Meanwhile, in response to the surround L channel being set, a speaker may be set in the same manner through the second channel setting item 614 for surround R channel setting. According to circumstances, in response to the surround L channel being set in the first speaker apparatus 200, the surround R channel may be automatically set in the second speaker 300. For example, this may be the case where only the surround R channel can be set in the second speaker apparatus 300. In this regard, the processor 130 may directly transmit information relating to the set channel to the second speaker apparatus 300.

Figure 7:
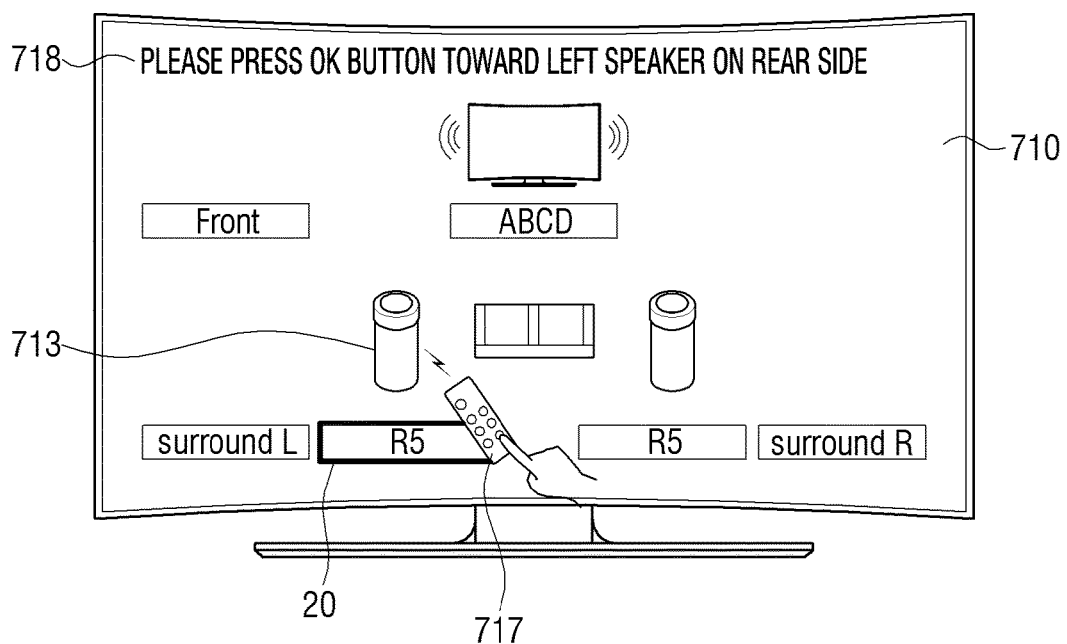
FIG. 7 is a diagram illustrating a UI provided in a display apparatus, according to another example embodiment.

FIG. 7 is a diagram illustrating a UI provided in a display apparatus 100, according to yet another example embodiment.

Accordingly, the configuration of the UI 710 illustrated in FIG. 7 which is different from that of the UI 610 illustrated in FIG. 6 will be described.

Referring to FIG. 7, a UI 717 and 718 guiding a user input for setting speakers to a particular channel may be provided. In this regard, the guide may include at least one from among an image guide 717 and a text guide 718 which guides the user to select a speaker apparatus (e.g., 713) through a remote controller.

Figure 8:
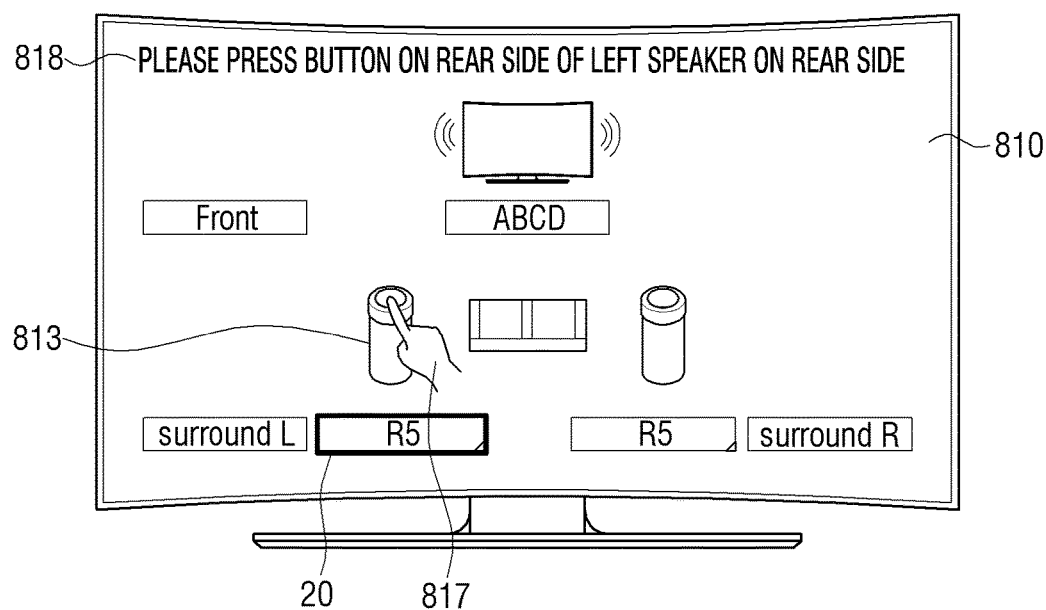
FIG. 8 is a diagram illustrating a UI provided in a display apparatus, according to yet another example embodiment.

FIG. 8 is a diagram illustrating a UI 810 provided in a display apparatus 100, according to yet another example embodiment.

Accordingly, the configuration of the UI 810 illustrated in FIG. 8 which is different from that of the UI 610 illustrated in FIG. 6 will be described.

Referring to FIG. 8, a UI 817 and 818 guiding a user input for setting speakers to a particular channel may be provided. In this regard, the guide may include at least one from among an image guide 817 and a text guide 818 which guides the user to perform a pressing operation with respect to a predetermined button provided in a speaker apparatus (e.g., 813).

Figure 9:
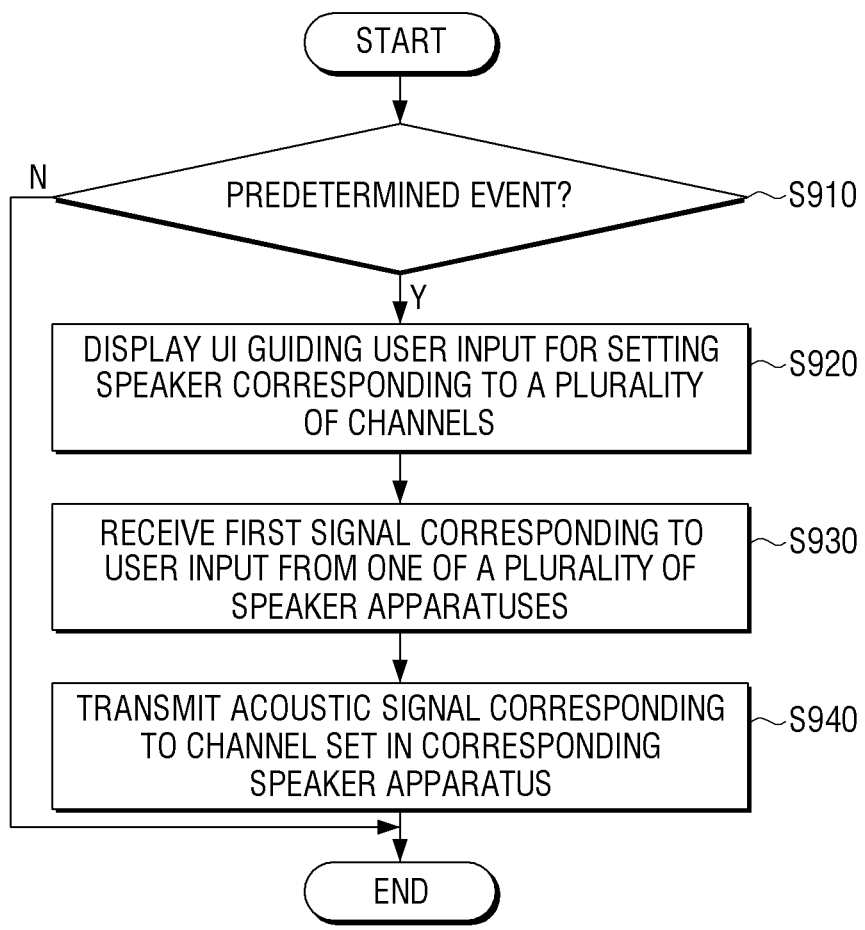
FIG. 9 is a flowchart illustrating a control method of a display apparatus, according to an example embodiment.

FIG. 9 is a flowchart illustrating a control method of a display apparatus, according to an example embodiment.

According to a control method of a display apparatus illustrated in FIG. 9, in response to a predetermined event occurring, S910:Y, a UI guiding a user input for setting a speaker corresponding to each of a plurality of channels is displayed at operation S920. In this regard, the UI may be a UI guiding a position of a speaker corresponding to a plurality of channels and guiding the user to select a speaker corresponding to each of the plurality of channels (e.g., see FIGS. 6-8). In this regard, the user input guide may include at least one from among a guide inducing the user to touch a speaker apparatus and a guide inducing a user to select a speaker apparatus through a remote controller.

Thereafter, in response to a first signal corresponding to a user input guide being received from at least one of a plurality of speaker apparatuses, at operation S930, an acoustic signal corresponding to a channel set to the corresponding speaker apparatus is transmitted at operation S940.

In addition, in response to a first signal being received from one of a plurality of speaker apparatuses, information relating to a channel set in the corresponding speaker apparatus may be transmitted and then, an acoustic signal corresponding to the set channel may be transmitted.

In addition, at operation S920 displaying a UI, in response to a predetermined event occurring, S910:Y, information relating to settable multi channel types may be displayed based on the number of speaker apparatuses connected (or connectable) with a display apparatus and a UI corresponding to a selected multi channel type may be displayed.

In addition, at operation S940 transmitting an acoustic signal, a second signal may be transmitted to at least one speaker apparatus corresponding to the set channel and, in response to a first signal being received from a speaker apparatus receiving the second signal, an acoustic signal may be transmitted to the corresponding speaker apparatus.

FIG. 10 is a sequence diagram illustrating an operation of a content output system, according to an example embodiment.

Referring to FIG. 10, first, a display apparatus 100 is connected with first and second speaker apparatuses 200 and 300 according to a predetermined event via a network, at operation S1011. For example, the display apparatus 100 and the first and second speaker apparatuses 200 and 300 may be in an interlocking state by performing communication according to a predetermined communication method (e.g., Wi-Fi network). For example, the interlocking may refer, for example, to all of states in which communication may be performed, such as an operation in which communication between the display apparatus 100 and an external apparatus (not illustrated) is initialized, an operation in which a network is formed, an operation in which an apparatus paring is performed, and/or the like. For example, device identification information of the display apparatus 100 may be provided to the first and second speaker apparatuses 200 and 300 at S1011. As a result, a pairing process between two apparatuses may be performed. For example, if a predetermined event (e.g., device selection command, device turn-on command, etc.) occurs in the display apparatus 100, a peripheral apparatus may be searched through a Digital Living Network Alliance (DLNA) technology and pairing with the searched apparatus may be performed. Accordingly, the two apparatuses may be interlocked with each other. According to circumstances, the display apparatus 100 may transmit a signal according to a communication connection completion to the first and second speaker apparatuses 200 and 300. In this regard, the first and second speaker apparatuses 200 and 300 may output an indicator guiding that a communication connection is completed. For example, a plurality of speakers 200-1, 200-2, . . . , 200-n may blink an LED or output an audio message, such as "pairing is complete".

Thereafter, the display apparatus 100 may display a UI for multi channel setting according to a predetermined event, at operation S1012. In this regard, a predetermined event may be a command to select a particular multi channel type from a UI including information relating to multi channel types, but is not limited thereto. In this regard, a UI including information relating to multi channel types may be a predetermined event, for example, an event in which a surround setting is selected from a sound setting menu of the display apparatus 100, but the example is not limited thereto. Meanwhile, a UI for multi channel setting may guide a position of a speaker corresponding to each of a plurality of channels and a user input for setting a speaker in a particular channel.

Thereafter, in response to a user command for setting a first channel being received on a UI for multi channel setting, at operation S1013, the display apparatus 100 may transmit a first signal corresponding to the user command to a first speaker apparatus 200 which is settable in the first channel, at operation S1014.

In this regard, the first speaker apparatus 200 may provide an indicating feedback in response to receiving the first signal, at operation S1015. In this regard, the indicating feedback may be in the form of at least one from among a visual feedback and an auditory feedback.

Thereafter, in response to a user command, e.g., a user touch, according to a user input guide being received on the first speaker apparatus, at operation S1016, the first speaker apparatus 200 may transmit a second signal corresponding to the user touch to the display apparatus 100, at operation S1017. In other words, the user may identify the first speaker apparatus 200 based on an indicating feedback provided from the first speaker apparatus 200 so that the user inputs a user command according to a user input guide.

The display apparatus 100 receiving the second signal may transmit first channel information to the first speaker apparatus 200, at operation S1018, and the first speaker apparatus 200 receiving the first channel information may be prepared to output an acoustic content based on the first channel information, at operation S1019. However, according to circumstances, the first channel information may be transmitted along with the first signal and in this case, the display apparatus 100 receiving the second signal may transmit an acoustic signal corresponding to the first channel, at operation S1017.

Meanwhile, in response to a user command for setting a second channel being received on a UI for multi channel setting, at operation S1020, the display apparatus 100 may transmit a first signal corresponding to the user command to a second speaker apparatus 300 which is settable in the second channel, at operation S1021.

In this regard, the second speaker apparatus 300 may provide an indicating feedback in response to receiving the first signal, at operation S1022.

Thereafter, in response to a user command, e.g., a user touch, according to a user input guide being received on the second speaker apparatus, at operation S1023, the second speaker apparatus 300 may transmit a second signal corresponding to the user touch to the display apparatus 100, at operation S1024.

The display apparatus 100 receiving the second signal may transmit second channel information to the second speaker apparatus 300, at operation S1025, and the second speaker apparatus 300 receiving the second channel information may be prepared to output an acoustic content based on the second channel information, at operation S1026. However, according to circumstances, the second channel information may be transmitted along with the first signal and in this case, the display apparatus 100 receiving the second signal may transmit an acoustic signal corresponding to the second channel, at operation S1025.

According to the various example embodiments of the present disclosure, a position of a speaker can be accurately perceived and an intuitive TV UX capable of setting channels can be provided.

The methods according to the above-described example embodiments may be realized as software or applications that may be installed in the existing display apparatus and speaker apparatus.

Meanwhile, the methods according to various example embodiments of the present disclosure described above can be implemented by only software/hardware upgrade for at least one from among existing display apparatus or content output apparatus.

The above-described example embodiments may be executed through an embedded server in the display apparatus and the content output apparatus or through an external server outside the display apparatus.

Further, a non-transitory computer readable medium recording therein program to sequentially perform a control method according to exemplary embodiments may be provided.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

For example, at least one from among these components, elements, modules or units may use a direct circuit structure, such as a memory, a processor, a logic circuit, a look-up table, etc. that may execute the respective functions through controls of one or more microprocessors or other control apparatuses.

What is claimed is:

1. A content output system comprising:
   a display apparatus configured to:
      provide a user interface (UI) for setting a speaker apparatus to each of a plurality of sound channels, the UI comprising a guide which induces a touch input of a user on the speaker apparatus and further including a plurality of channel setting icons for receiving an input of a user for setting a channel of a selected speaker apparatus; and
   a plurality of speaker apparatuses, each of the plurality of speaker apparatuses configured to:
      based on receiving a control signal from the display apparatus, provide a first indicating feedback for identification of the speaker apparatus, and
      based on receiving touch input of the user on the speaker apparatus, transmit a signal corresponding to the touch input to the display apparatus,
   wherein the display apparatus is further configured to, based on receiving the signal from the speaker apparatus, transmit an acoustic signal corresponding to a particular sound to the speaker apparatus,
   wherein the speaker apparatuses are further configured to, based on receiving a control signal from the display apparatus, provide a second indicating feedback indicating that channel setting is completed, the second indicating feedback being different from the first indicating feedback.

2. The content output system as claimed in claim 1, wherein the UI is configured to guide a position of a speaker apparatus corresponding to each of the plurality of channels.

3. The content output system as claimed in claim 1, wherein the display apparatus is configured to provide information relating to a multi channel type settable based on a number of a plurality of speaker apparatuses connected to the display apparatus,
   wherein the display apparatus is configured to, in response to a particular multi channel type being selected, display the UI corresponding to the multi channel type.

4. The content output system as claimed in claim 1, wherein the second indicating feedback is at least one from among a visual feedback lighting a predetermined area of the speaker apparatus and an auditory feedback outputting a predetermined acoustic signal.

5. The content output system as claimed in claim 4, wherein a predetermined area of the speaker apparatus is a name area of the speaker apparatus.

6. The content output system as claimed in claim 1, wherein the display apparatus is configured to display the UI comprising a guide which induces a selection of a speaker apparatus by using a remote controller, and
   the plurality of speaker apparatuses are configured to, based on receiving a remote signal from the remote controller, transmit a signal corresponding to the remote signal to the display apparatus.

7. The content output system as claimed in claim 1, wherein the display apparatus is configured to display the UI comprising a guide which induces a selection of the display apparatus by using a remote controller.

8. A display apparatus, comprising:
   a display;
   a communication interface, including communication circuitry; and
   a processor configured to:
      control the display to display a UI for setting a speaker apparatus to one of a plurality of sound channels, the UI comprising a guide which induces a touch input of a user on the speaker apparatus and further including a plurality of channel setting icons for receiving an input of a user for setting a channel of a selected speaker apparatus and for causing the speaker apparatus to provide a first indicating feedback identifying the speaker apparatus,
      based on a signal corresponding to the input of the user for the speaker apparatus being received from the speaker apparatus, control the communication interface to transmit an acoustic signal corresponding to a particular sound channel to the speaker apparatus, and
      control to provide a control signal from the display apparatus to the speaker apparatus, for causing the speaker apparatus to provide a second indicating feedback indicating that channel setting is completed, the second indicating feedback being different than the first indicating feedback.

9. The display apparatus as claimed in claim 8, wherein the UI is configured to guide a position of a speaker apparatus corresponding to each of the plurality of channels.

10. The display apparatus as claimed in claim 8, wherein the processor is configured to provide information relating to a multi channel type settable based on a number of a plurality of speaker apparatuses connected to the display apparatus, and display the UI corresponding to a selected multi channel type.

11. The display apparatus as claimed in claim 8, wherein the processor is configured to provide the UI comprising a guide which induces a selection of a speaker apparatus by using a remote controller.

12. A method for controlling a display apparatus, the method comprising:
   providing a UI for setting a speaker apparatus to one of a plurality of channels, the UI comprising a guide which induces a touch input of a user on the speaker apparatus and further including a plurality of channel setting icons for receiving input of a user for setting a channel of a selected speaker apparatus and for causing the speaker apparatus to provide a first indicating feedback identifying the speaker apparatus;

based on a signal corresponding to the touch input of the user on the speaker apparatus being received from the speaker apparatus, transmitting an acoustic signal corresponding to a particular sound channel to the speaker apparatus, and providing a control signal from the display apparatus to the speaker apparatus, the control signal for causing the speaker apparatus to provide a second indicating feedback indicating that channel setting is completed, the second indicating feedback being different than the first indicating feedback.

13. The method as claimed in claim 12, wherein the UI guides a position of a speaker apparatus corresponding to each of the plurality of channels.

14. The method as claimed in claim 12, wherein the providing the UI comprises displaying information relating to a settable multi channel type based on a number of a plurality of speaker apparatuses connected to the display apparatus according to a predetermined event, and displaying the UI corresponding to a selected multi channel type.

15. The method as claimed in claim 12, wherein the UI comprises a guide which induces a selection of a speaker apparatus by using a remote controller.

* * * * *